Aug. 12, 1969 M. J. KJOS 3,460,780
MULTIPLE STATION TAPE HANDLING APPARATUS
Filed April 28, 1967
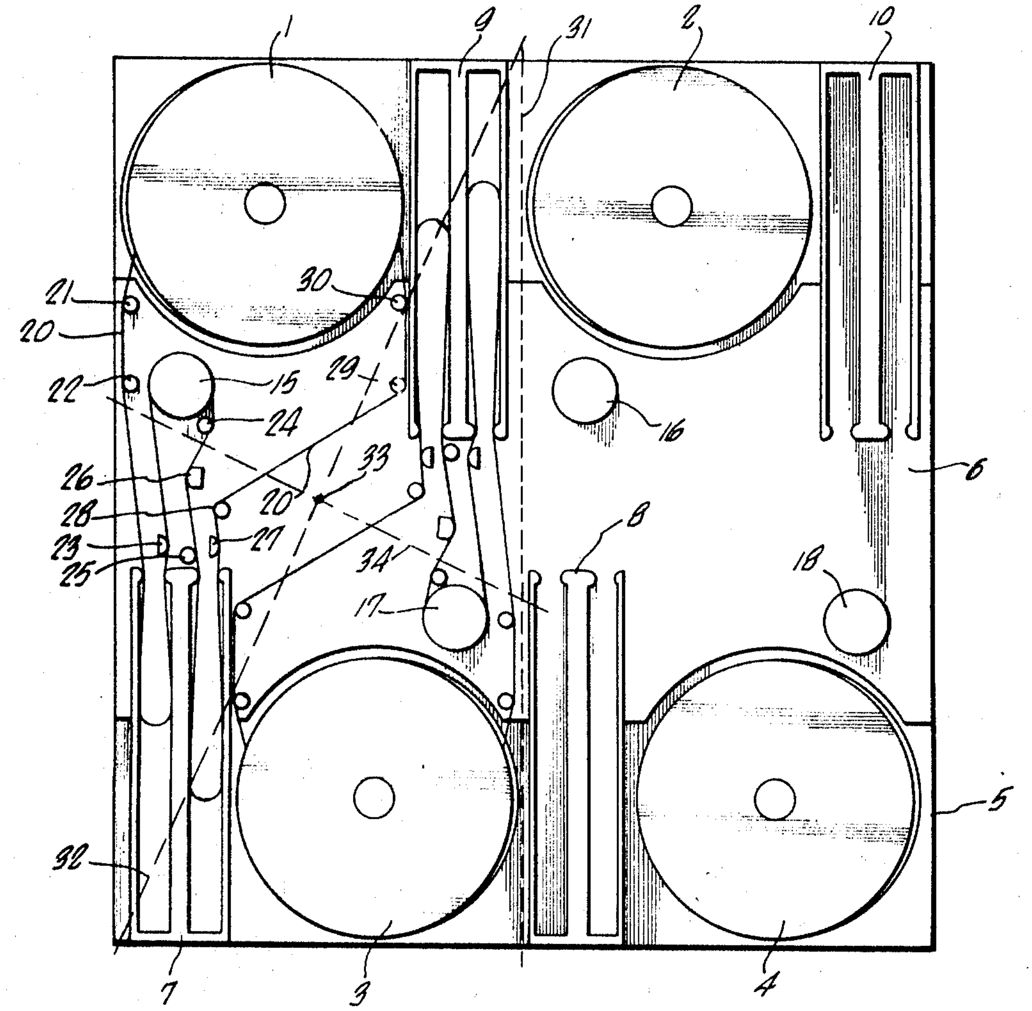
INVENTOR
MAGNE JARLE KJOS
BY
Christie, Parker & Hale
ATTORNEYS.

United States Patent Office 3,460,780
Patented Aug. 12, 1969

3,460,780

MULTIPLE STATION TAPE HANDLING APPARATUS

Magne Jarle Kjos, Duarte, Calif., assignor to Burroughs Corporation, Detroit, Mich., a corporation of Michigan Filed Apr. 28, 1967, Ser. No. 634,723
Int. Cl. G11b *15/44*
U.S. Cl. 242—180 14 Claims

ABSTRACT OF THE DISCLOSURE

A plurality of spaced-apart pairs of coaxially arranged tape reels and a common work surface for transporting the tape from each pair of reels. Vacuum column pairs are arranged in staggered relationship in two rows such that all the vacuum columns are parallel to one another. Each reel pair is located substantially across from the vacuum column pair that serves it. The tape handling stations, each including one reel pair, are grouped in couples such that the components of each couple occupy a rectangular area having an odd-function positional relationship.

BACKGROUND OF THE INVENTION

This invention relates to tape handling apparatus and, more particularly, to a component arrangement particularly well adapted for multiple station tape handling apparatus.

A copending application of Harry F. Rayfield, entitled "Tape Apparatus," Ser. No. 459,625, filed June 30, 1965, now Patent No. 3,345,007, and assigned to the assignee of the present invention, discloses a multiple station tape handling system in which four coaxially arranged pairs of tape storage reels are spaced apart at substantially the same horizontal level. This application matured into Patent 3,345,007 on Oct. 3, 1967. The tape from each pair of reels is brought to a common horizontal work surface along which it is transported past a transducer. All the tape handling components, including guide rollers, capstans, transducers, tape cleaners, and vacuum columns are mounted on the common work surface. A pair of vacuum columns in orthogonal relationship to one another is provided for each reel pair. The vacuum column pairs are grouped on the common work surface in the form of a cross that defines quadrants. One reel pair lies in each quadrant so it subtends the right angle formed by the corresponding pair of vacuum columns.

The above-described arrangement of components represents a radical departure from the previous approaches taken to the design of multiple station tape handling apparatus. It results in a compact, easy-to-operate piece of equipment. Further, this arrangement lends itself particularly well to component sharing so a low-cost tape handling unit can be produced, and it facilitates component access so maintenance can be quickly carried out.

The orthogonal arrangement of vacuum columns for each reel pair is convenient for a tape drive with pinch roller and capstan. Since the pinch roller presses the tape into engagement with the capstan during tape transport, contact between the capstan and the tape is only necessary over a small area of the capstan surface. Accordingly, between the vacuum columns the tape can take a smooth, roughly semicircular path running inside of the reel pair. The orthogonal vacuum column arrangement is not particularly well suited, however, for use with a single-capstan drive in which the tape is maintained in continuous contact with the capstan without benefit of pinch rollers. In such an arrangement, a great deal of contact between the tape and the capstan is desirable to obtain complete engagement of the tape with the capstan. Preferably, the tape is wrapped around at least 180 degrees of the capstan surface. An attempt to provide a tape path between the vacuum columns that satisfies this requirement results in consumption of a larger area on the common work surface and more drag on the tape. Since a single capstan drives the tape in both directions, increased drag in the tape path makes it more difficult for the tape driven by the capstan to feed smoothly into the vacuum columns.

A factor that limits the speed at which tape can be effectively transported in a high-speed precision tape handling system is the length of the vacuum columns. Upon increasing the speed of tape transport, the vacuum columns serving a reel pair must be lengthened to increase their capacity as a tape buffer. An increase in the length of the vacuum columns in the above-described cross arrangement of vacuum column pairs necessitates that both dimensions of the common work surface on which the vacuum columns are mounted be expanded. The common work surface grows essentially by the square of the increase in length of the vacuum columns. Attempts to increase the transport speed may therefore destroy the compactness of the equipment and make passage through doorways difficult or impossible.

SUMMARY OF THE INVENTION

The invention contemplates a relationship between each pair of coaxially arranged reels and its vacuum columns in a multiple station system that is particularly well suited for use with a single-capstan drive and allows the vacuum columns to be lengthened without increasing both dimensions of the work surface. The vacuum columns for each reel pair are arranged in a common plane in parallel relationship with respect to each other. Each vacuum column pair lies across from the reel pair it serves with its open ends facing the reel pair. Preferably, the vaccuum column pairs are all parallel to one another. If four or more stations are employed the vacuum column pairs are spaced apart in two rows, the vacuum column pairs of one row being staggered with respect to the vacuum column pairs of the other row. A reel pair is situated in the space between each pair of vacuum columns substantially across from the vacuum column pair that serves it. In lengthening the vacuum columns, only one dimension of the work surface must be expanded since all the vacuum columns are parallel to one another. The fact that the vacuum columns corresponding to each reel pair are grouped together side by side permits tape to be wrapped around a single-capstan drive in the tape path between the vacuum columns without large consumption of space on the work surface or introduction of added tape drag.

According to a feature of the invention, the stations are arranged in couples. Each couple occupies a rectangular area in the common plane. The components of the stations in a couple are situated in the common plane with an odd-function relationship with repect to rectangular coordinate defined by a diagonal of the rectangular area and a line bisecting it perpendicularly. This feature produces a very compact unit that utilizes the area of the common plane efficiently. Further, it permits the addition of more couples to the unit, while preserving a compact rectangular configuration.

BRIEF DESCRIPTION OF THE DRAWING

These and other features of the invention are considered further in the following detailed description taken in conjunction with the drawing, the single figure of which discloses a top plan view of multiple station tape handling apparatus embodying the principles of the invention.

DESCRIPTION OF A SPECIFIC EMBODIMENT

In the drawing, pairs 1, 2, 3, and 4 of coaxially arranged reels define individual tape stations housed in a single rectangular cabinet designated 5. A flat deck plate 6 provides a common work plane along which tape from each reel pair is driven past a transducer. Pairs 7 and 8 of vacuum columns, which are associated with reel pairs 1 and 2, respectively, are mounted in spaced-apart relationship in a row on deck plate 6. Pairs 9 and 10 of vacuum columns, which are associated with reel pairs 3 and 4, respectively, are mounted in another row in spaced-apart relationship. Vacuum column pairs 9 and 10 are staggered with respect to vacuum column pairs 7 and 8. Each vacuum column pair (for example 9) is adjacent to a reel pair (for example 1). Further, each vacuum column pair (for example 9) is across from a reel pair (for example 3) with its open ends facing the reel pair. Vacuum column pairs 7, 8, 9, and 10 are all arranged in parallel relationship to one another. Thus, only one dimension of deck plate 6 must be expanded to lengthen the vacuum columns. Capstans 15, 16, 17, and 18 drive the tape from reel pairs 1, 2, 3, and 4, respectively, between their corresponding vacuum columns. Capstans 15 through 18 are so-called single-capstan drives, which transport tape in either the forward or reverse direction. The tape remains in substantially nonsliding contact with its capstan at all times during operation. Each capstan is driven by a reversible motor (not shown), which advantageously could be a printed-circuit motor having small inertia to facilitate quick starts and stops.

Only the paths of tape from reel pairs 1 and 3 are represented in the drawing. The paths of tape from reel pairs 2 and 4 are identical to the tape paths shown for reel pairs 1 and 3. Tape 20 is guided by guide rollers 21 and 22 from one reel of pair 1 to one vacuum column of pair 7 in which tape 20 forms a slack loop. After leaving the one vacuum column, tape 20 passes over a tape cleaner 23, is wrapped around capstan 15, and is guided by tape guides 24 and 25 past a transducer 26 and into the other vacuum column of pair 7. Tape 20 forms a slack loop in the other vacuum column of pair 7 from which it extends past a tape cleaner 27 in guide rollers 28, 29, and 30 to the other reel of pair 1. Tape 20 is in substantially nonslipping contact with capstan 15 over slightly more than 180 degrees of its surface. As illustrated in the figure, capstan 15 is located at a point in the tape path at which a change in the direction of tape travel from one vacuum column of pair 7 toward the other is effected. As a result, the requirement that the tape come in contact with the capstan over a large portion of its surface can be fulfilled in the course of the normal change in direction of tape travel. Thus, the complexity of the tape path is not increased more than would be dictated by the position of the vacuum columns. Further, little drag is exerted on the tape in guiding it over the capstan and past the transducer, because contact between the tape and the tape guides (24 and 25) takes place over only a small area of the guides.

Most advantageously, the coaxially arranged reel pairs are canted with respect to deck plate 6. In such case, guide rollers 21 and 22, 29 and 30 could be located and oriented according to the criterion disclosed in a copending application of Harry F. Rayfield and Magne Jarle Kjos, entitled "Multiple Station Tape Handling Apparatus," Ser. No. 610,257, filed Jan. 19, 1967, now Patent No. 3,443,766, and assigned to the same assignee as the present invention. The other features of this application could also be employed. The same tape handling components (without reference numerals in the drawing) are associated with reel pair 3.

The tape handling stations are grouped in couples, each occupying a rectangular space. Thus, the components of the couple including reel pairs 1 and 3 occupy the rectangular space to the left of an imaginary line 31, while the components of the couple including reel pairs 2 and 4 occupy the rectangular space to the right of line 31. Multiple station tape handling apparatus that comprises one, two, three, or more couples could be constructed according to the principles of the invention. In each case, a compact rectangular configuration results. The components of the two stations in a couple are situated in the plane of deck plate 6 with an odd-function relationship in rectangular coordinates defined by an imaginary line 32 that runs diagonally across the rectangular area occupied by the couple and an imaginary line 34 that bisects line 32 perpendicularly. The term "odd-function relationship" is used in its mathematical sense, according to which the rectangular coordinates of corresponding components of the two stations in a couple are equal in magnitude and opposite in polarity with respect to lines 32 and 34. For example, capstan 15 lies to the left of line 32 by the same perpendicular distance that capstan 17 lies to the right of line 32, and capstan 15 lies above line 34 by the same perpendicular distance that capstan 17 lies below line 34. By utilizing such a substantially odd-functon relationship, two tape handling stations can be placed together in an extremely compact, rectangular configuration to form a couple and any number of couples can be added to the system.

Generally speaking, it is desirable to maintain one of the horizontal dimensions of the tape unit, either the length or width, small enough so the unit will pass through ordinary doorways.

It may be desirable to have the capability to expand the length of the vacuum columns in order to permit higher tape transport speeds. In such case, the horizontal dimension perpendicular to the vacuum columns in the drawing would remain fixed and sufficiently small to permit passage through doorways. According, there would be a limit on the number of couples that could be practically used in one unit.

On the other hand, it may be desirable to have the capability of adding any number of couples. Then the horizontal dimension parallel to the vacuum columns must be fixed and held sufficiently small to pass through doorways. In such case, a slight deviation from the component arrangement shown in the drawing might be found advantageous. This deviation would reduce the horizontal dimension parallel to the vacuum columns and increase the horizontal dimension perpendicular to the vacuum columns. In the deviation, each reel pair would be moved slightly to the side of the vacuum column pair that serves it so the corresponding capstan can be moved to a position near the corner of the rectangular area (toward the corresponding reel pair). For example, reel pair 1 would be moved to the right, and capstan 15 would be moved into the upper left-hand corner of the unit. In addition, the vacuum column pair would extend substantially to a tangent line of its reel pair lying perpendicular to the vacuum column pairs. In the described deviation, the vacuum column pairs are still considered to lie across from and to face the reel pair they serve.

In the specific embodiment shown, a single deck plate 6 is employed for all the stations. In some cases, it might be advantageous to employ separate deck plates for each station on which the components of that station are mounted These individual deck plates would all lie substantially in a common plane as is the case with the single deck plate 6.

What is claimed is:

1. Multiple station tape handling apparatus comprising: support means forming a common work plane; a plurality of pairs of coaxially arranged tape storage reels mounted in proximity to the common work plane; a pair of vacuum columns in parallel relationship corresponding to each pair of reels, each pair of vacuum columns being located across from the corresponding reel pair with the open ends of the vacuum columns substantially facing the reel pair; means individual to each pair of reels for guiding tape between the reels of the pair and the common work plane; means individual to each pair of reels for guiding tape along the common work plane in a tape path that forms slack loops in the parallel vacuum columns; transducing means individual to each pair of reels located on the common work plane along the portion of the tape path between the parallel vacuum columns; and means individual to each pair of reels in the tape path for driving tape past the corresponding transducing means.

2. The tape handling apparatus of claim 1, in which each pair of vacuum columns is located across from the corresponding reel pair with the open ends of the vacuum columns substantially facing the reel pair.

3. Multiple station tape handling apparatus comprising: support means forming a common work plane; a plurality of pairs of coaxially arranged tape storage reels mounted in proximity to the common work plane; a pair of vacuum columns in parallel relationship corresponding to each pair of reels, the vacuum column pairs being parallel to one another; means individual to each pair of reels for guiding tape between the reels of the pair and the common work plane; means individual to each pair of reels for guiding tape along the common work plane in a tape path that forms slack loops in the parallel vacuum columns; transducing means individual to each pair of reels located on the common work plane along the portion of the tape path between the parallel vacuum columns; and means individual to each pair of reels in the tape path for driving tape past the corresponding transducing means.

4. Multiple station tape handling apparatus comprising: support means forming a common work plane;

a plurality of pairs of coaxially arranged tape storage reels mounted in proximity to the common work plane;

a pair of vacuum columns in parallel relationship corresponding to each pair of reels;

means individual to each pair of reels for guiding tape between the reels of the pair and the common work plane;

means individual to each pair of reels for guiding tape along the common work plane in a tape path that forms slack loops in the parallel vacuum columns;

transducing means individual to each pair of reels located on the common work plane along the portion of the tape path between the parallel vacuum columns; and a single capstan individual to each pair of reels, the single capstan being located at a point in the portion of the tape path between the parallel vacuum columns where the tape changes direction from one vacuum column or the other such that the tape is in contact with the capstan over an area of substantially 180°.

5. Multiple station tape handling apparatus comprising: support means forming a common work plane;

first and second pairs of coaxially arranged tape storage reels mounted in proximity to the common work plane;

first and second pairs of vacuum columns in parallel relationship corresponding respectively to the first and second pairs of reels, the first pair of reels and the second pair of vacuum columns being adjacent to one another, the second pair of reels and the first pair of vacuum columns being adjacent to one another, the first and second pairs of vacuum columns being parallel to one another, the first pair of vacuum columns being located across from the first pair of reels with its open ends facing the first pair of reels, and the second pair of vacuum columns being located across from the second pair of reels with its open ends facing the second pair of reels;

means individual to each pair of reels for guiding tape between the reels of the pair of the common work plane;

means individual to each pair of reels for guiding tape along the common work plane in the tape path that forms slack loops in the parallel vacuum columns;

transducing means individual to each pair of reels located on the common work plane along the portion of the tape path between the parallel vacuum columns; and means individual to each pair of reels in the tape path for driving tape past the corresponding transducing means.

6. The tape handling apparatus of claim 5, in which the first and second reel pairs and the first and second vacuum column pairs occupy a rectangular area with the first and second reel pairs in one set of diagonal corners of the area and the first and second vacuum pairs in the other set of diagonal corners of the area.

7. The tape handling apparatus of claim 6, in which a single capstan for each reel pair is provided, the capstan being located in front of the open ends of and substantially between the corresponding vacuum column pair.

8. The tape handling apparatus of claim 7, in which the tape path formed by the means individual to each pair of reels for guiding tape along the common work plane extends from one vacuum column around the capstan to the other vacuum column such that the tape is in contact with the capstan over substantially 180 degrees of its surface and the transducing means is located substantially in a straight line between the capstan and one vacuum column.

9. Tape handling apparatus comprising: first and second coaxially arranged tape storage reels located in spaced-apart relationship; support means defining a common work plane along which the tape from both reel pairs is to be transported; a first group of tape handling components for guiding the tape from the first reel pair along the common work plane; a second group of tape handling components for guiding the tape from the second reel pair along the common work plane; the first and second reel pairs and the first and second group of tape handling components occupying a rectangular area in the common work plane; and the first reel pair and the first group of tape handling components being arranged in the common work plane so as to have an odd-function positional relationship to the second reel pair and the second group of tape handling components with respect to rectangular coordinates defined by a diagonal of the rectangular area and a line bisecting it perpendicularly.

10. The tape handling apparatus of claim 9, in which the first and second group of tape handling components each include a pair of vacuum columns, transducing means, and a capstan.

11. The tape handling apparatus of claim 9, in which the first and second group of tape handling components each include a pair of parallel vacuum columns located across from the corresponding reel pair with its open ends facing the reel pair, the vacuum column pairs being parallel to one another.

12. The tape handling apparatus of claim 11, in which the first and second group of tape handling components each include a single capstan located in front of and substantially between the two vacuum columns of the group.

13. Multiple station tape handling apparatus comprising: a plurality of pairs of vacuum columns in parallel relationship, the vacuum columns being arranged in two spaced-apart rows in staggered relationship; a plurality of pairs of coaxially arranged tape storage reels arranged in two rows in the spaces between the vacuum column pairs; and means for guiding the tape from each reel pair in a tape path including the vacuum column pair across from the reel pair, the open ends of the vacuum columns in one row facing the open ends of the vacuum columns in the other row.

14. The tape handling apparatus of claim 13, in which a capstan for each reel pair is located between the reel pair and the corresponding vacuum column pair.

References Cited

UNITED STATES PATENTS 3,345,007 10/1967 Rayfield ___________ 242—55.12

LEONARD D. CHRISTIAN, Primary Examiner

U.S. Cl. X.R.

226—118; 242—182, 193